J. WOOD.
Railway Frogs.
No. 5,473. Reissued July 1, 1873.
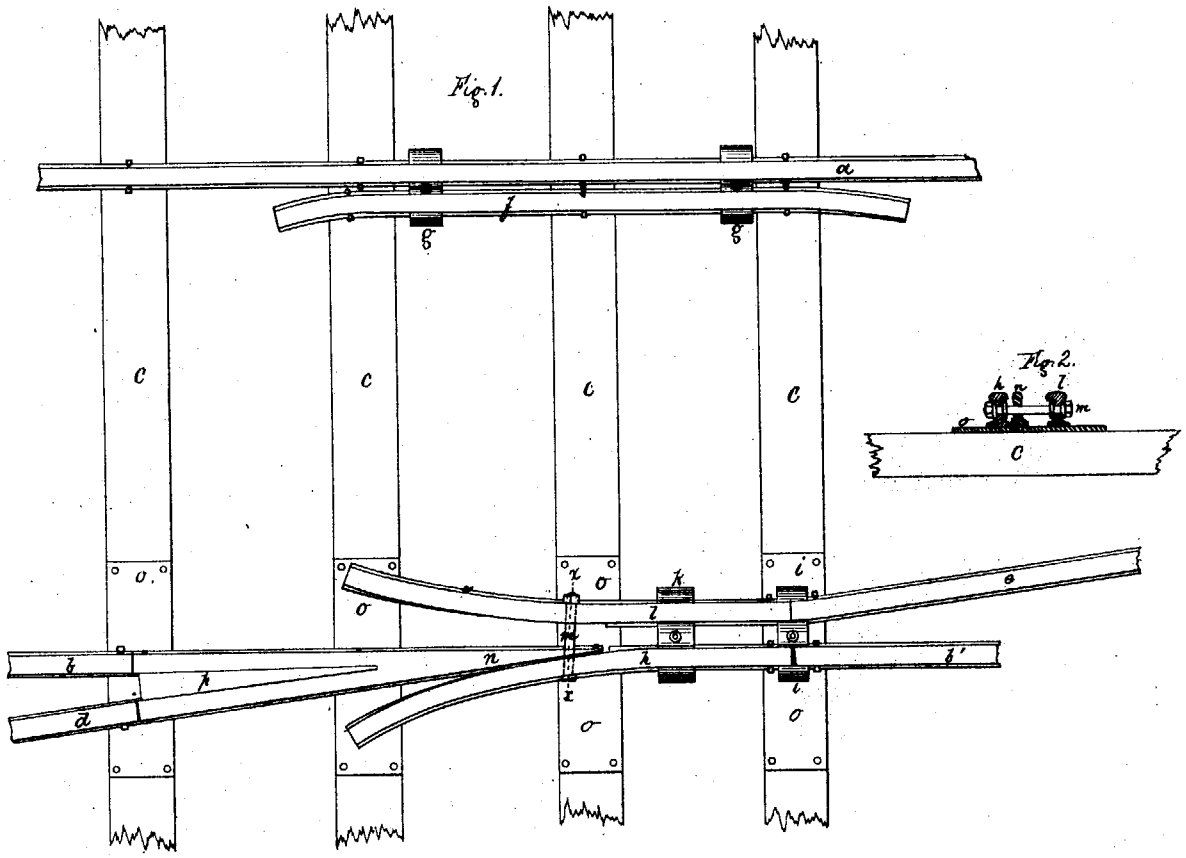
WITNESSES.
J. Homer Hildreth
John H. Harris
INVENTOR.
Joseph Wood
by Cochrane & Malcomson
his Attorneys
THE NORRIS PETERS CO., PHOTO-LITHO., WASHINGTON, D. C.

UNITED STATES PATENT OFFICE

JOSEPH WOOD, OF RED BANK, NEW JERSEY, ASSIGNOR OF ONE-HALF INTEREST TO E. R. BENNETT.

IMPROVEMENT IN RAILWAY FROGS.

Specification forming part of Letters Patent No. 34,022, dated December 24, 1861; reissue No. 5,473, dated July 1, 1873; application filed March 31, 1873.

*To all whom it may concern:*

Be it known that I, JOSEPH WOOD, of Red Bank, in the county of Monmouth and State of New Jersey, have invented certain new and useful Improvements in Frogs for Railroads; and I do hereby declare that the following is a full, clear, and exact description of my invention, reference being had to the accompanying drawing, in which—

Figure 1 is a plan view of my frog. Fig. 2 is a cross-section at the line *x x* of Fig. 1.

At the point where the rails of a turn-out intersect the main track frogs are introduced, those for ordinary city travel being composed of a solid piece of metal with two intersecting grooves, and those adapted to locomotives and trains being either of this same general character, or else a movable rail or tongue is introduced at the point, so that the track may be made continuous by moving the tongue from side to side. In the former instance concussion is produced on the wheels in passing through the grooves of the frog, and in the latter case a switchman has to attend to the frog and move the tongue for passing cars. Two rails have also been used, kept to the sides of the frog-point by springs; but in all such instances the springs are liable to become injured, and each wheel of the train, in passing, has to move and keep open the track against the action of the spring.

The nature of my invention consists in an arrangement and construction of the frog-bars or wings of the frog and the point or tongue of the frog in such a manner that the wings will be moved automatically by the action of the flange of the car-wheel when passing through the frog; and also in increasing the strength and wearing capacity of the point or tongue of the frog by the use of a block placed between its rails.

In order to enable others skilled in the art to make and use my improved frog, I will describe its construction and operation.

In the drawing, *a* and *b b'* are the rails of the main track, and *d* and *e* represent the rail of the turn-out before and after passing the frog. *f* is a bar or guard-rail, curved at each end, and connected to the rail *a* by the tie-pieces *g g*, there being room enough left between the rails *a* and *f* for the passage of the flanges of the car-wheels. *h* and *l* are two frog-bars or wings, *l* connecting with and being a continuation of the rail *e* of the turn-out, and *h* answering the same relation to the rail *b'* of the main track. The bolt *m* passes through a hole made in the tongue or point *n*, and is rigidly secured to the side rails *h* and *l* by screw-nuts or other suitable means, as shown in Fig. 2, thus serving to hold the wings or frog-rails together, and, at the same time, secure them to the point of the frog. These frog-rails may also be held together at the middle by the tie-piece *k* or any other convenient means. The point *n* is firmly riveted or otherwise secured to the wrought-iron plate *o*, upon which the wings *h* and *l* also rest. The ends of the frog-bars or wings *h* and *l* are secured in place by the cast or wrought iron shoes *i i*, but are sufficiently free therein to swing from those ends, so that either the rail *l* or the rail *h* is close to the point, leaving on the other side of the point sufficient room for the wheel-flange to pass, and presenting an immediate bearing for the tread of the wheel as soon as it leaves the point or side rail, the guard-rail *f* on the main track, or a similar one on the other side in the turn-out track, keeping the wheels on the rails and insuring that the frog-bars *h* and *l* shall be moved by the wheels of a passing train from the position they have been left in by a previous passage of a train on the other track. As the rails forming the point *n* are subject to great strain and wear by the action of passing wheels, I strengthen and protect such rails by inserting between them a metallic block, *p*, which is fastened to the rails in any convenient manner. This block may be of any desired length, but always of the proper angle or shape to fit snugly between and bear against the inner sides of the point-rails, and of sufficient height to be flush with the top of such rails and present a bearing for the tread of the car-wheels.

Having described my improved frog and its mode of operation, what I claim therein as new, and desire to secure by Letters Patent, is—

1. A railroad frog having wings *h* and *l* connected to each other, and constructed so that such wings are moved automatically by the flanges of the wheels when passing through it, substantially as shown and described.

2. A railroad frog with the point *n* riveted to a plate, substantially as described.

3. A railroad frog having a plate, *o*, upon which the side rails rest, and to which the point *n* is riveted.

4. The bolt *m* passing through the point *n* and fastened to the frog-bars *h* and *l*, substantially as shown and described.

5. A railroad frog with a block, *p*, placed between the rails of the point and secured thereto, substantially as and for the purposes shown and described.

Witnesses: JOSEPH WOOD.

A. B. MALCOMSON, Jr.,

JOHN H. HARRIS.